United States Patent
Cheng et al.

(10) Patent No.: US 12,336,042 B2
(45) Date of Patent: Jun. 17, 2025

(54) DISCONTINUOUS RECEPTION (DRX) CONFIGURATION FOR SIDELINK COMMUNICATIONS BY A USER EQUIPMENT (UE)

(71) Applicant: QUALCOMM Incorporated, San Diego, CA (US)

(72) Inventors: Hong Cheng, Basking Ridge, NJ (US); Qing Li, Princeton Junction, NJ (US); Junyi Li, Fairless Hills, PA (US); Dan Vassilovski, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 537 days.

(21) Appl. No.: 17/467,409

(22) Filed: Sep. 6, 2021

(65) Prior Publication Data
US 2023/0073478 A1     Mar. 9, 2023

(51) Int. Cl.
*H04W 76/28*     (2018.01)
*H04W 68/00*     (2009.01)
(Continued)

(52) U.S. Cl.
CPC ......... *H04W 76/28* (2018.02); *H04W 68/005* (2013.01); *H04W 76/25* (2018.02); *H04W 92/18* (2013.01)

(58) Field of Classification Search
CPC ... H04W 76/28; H04W 68/005; H04W 76/25; H04W 92/18; H04W 76/14; H04W 52/0216; H04W 76/40; Y02D 30/70
See application file for complete search history.

(56) References Cited

U.S. PATENT DOCUMENTS

| | | |
|---|---|---|
| 2021/0051587 A1 | 2/2021 | Wu et al. |
| 2021/0136856 A1* | 5/2021 | Tseng .................. H04W 76/14 |

(Continued)

FOREIGN PATENT DOCUMENTS

| | | |
|---|---|---|
| WO | WO-2021093203 A1 | 5/2021 |
| WO | WO-2021147011 A1 | 7/2021 |
| WO | WO-2023000321 A1 * | 1/2023 |

OTHER PUBLICATIONS

Zhang et al., "Grouping-Based Discontinuous Reception for Massive Narrowband Internet of Things Systems", Jun. 2018, IEEE, IEEE Internet of Things Journal, vol. 5, No. 3, pp. 1561-1571 (Year: 2018).*

(Continued)

*Primary Examiner* — Michael K Phillips
(74) *Attorney, Agent, or Firm* — Norton Rose Fulbright US LLP

(57) ABSTRACT

A first user equipment (UE) for wireless communication includes a transmitter configured to transmit, to a second UE, a request associated with a sidelink discontinuous reception (DRX) configuration of the first UE for sidelink communication between the first UE and one or more UEs that are distinct from the first UE. The first UE further includes a receiver configured to receive, from the second UE based on the request, a message indicating one or more parameters associated with the sidelink DRX configuration. The transmitter is further configured to transmit, to the second UE based on the message, a response indicating one of acceptance of or rejection of at least one parameter of the one or more parameters.

30 Claims, 8 Drawing Sheets

(51) Int. Cl.
*H04W 76/25* (2018.01)
*H04W 92/18* (2009.01)

(56) References Cited

U.S. PATENT DOCUMENTS

| | | | |
|---|---|---|---|
| 2021/0219268 A1* | 7/2021 | Li | H04L 1/1819 |
| 2021/0219377 A1* | 7/2021 | Balasubramanian | H04W 76/28 |
| 2022/0191795 A1* | 6/2022 | Pan | H04W 52/0232 |
| 2023/0014303 A1* | 1/2023 | Di Girolamo | H04W 72/20 |
| 2023/0063472 A1* | 3/2023 | Freda | H04W 76/28 |
| 2023/0097552 A1* | 3/2023 | Freda | H04L 1/1848 370/329 |
| 2023/0156858 A1* | 5/2023 | Freda | H04W 52/0229 370/329 |
| 2023/0199909 A1* | 6/2023 | Mohammad Sloeymani | H04W 52/0235 370/329 |
| 2023/0247553 A1* | 8/2023 | Zheng | H04L 5/0033 370/311 |
| 2023/0276364 A1* | 8/2023 | Basu Mallick | H04W 76/28 370/311 |
| 2024/0373500 A1* | 11/2024 | Buthler | H04W 28/0268 |

OTHER PUBLICATIONS

International Search Report and Written Opinion—PCT/US2022/074541—ISA/EPO—Nov. 29, 2022 (2103736WO).

* cited by examiner

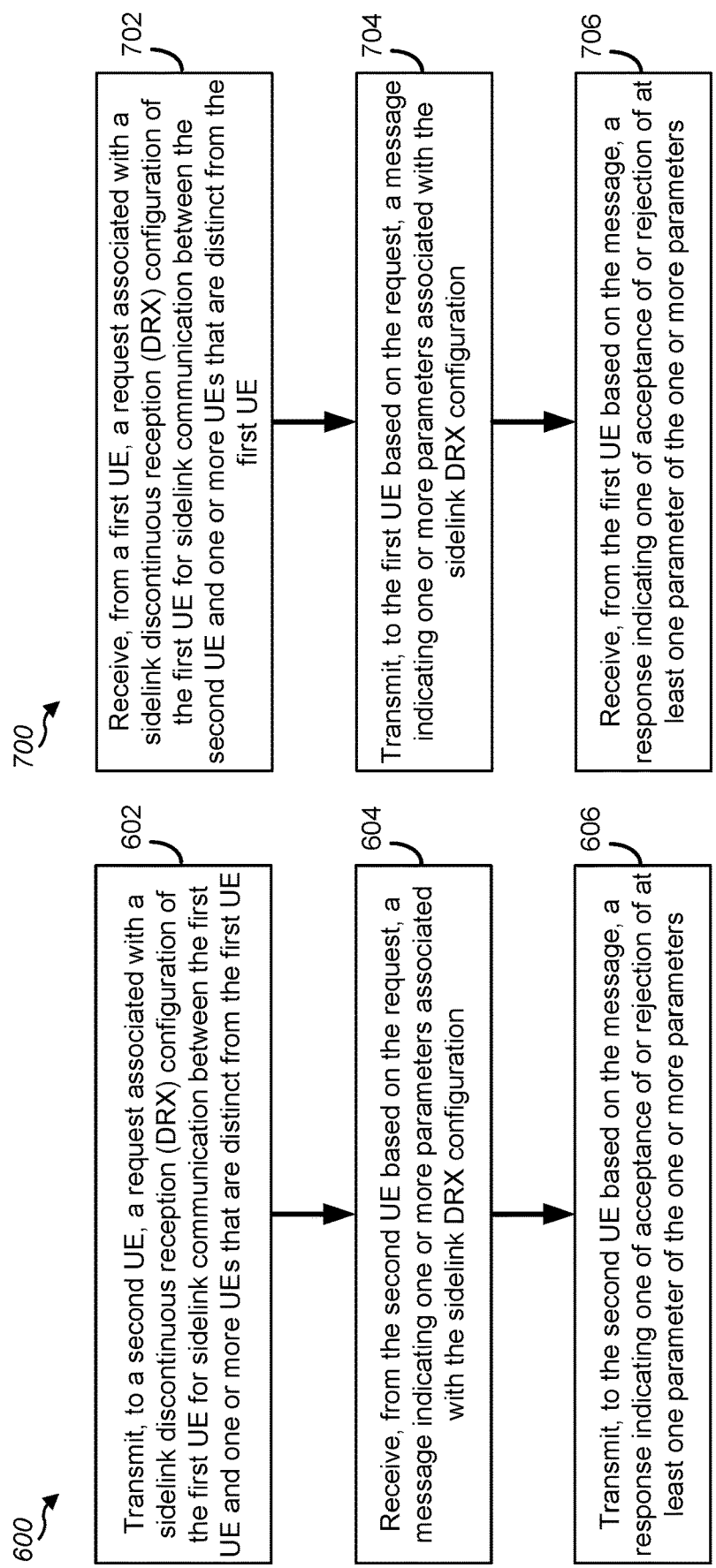

DISCONTINUOUS RECEPTION (DRX) CONFIGURATION FOR SIDELINK COMMUNICATIONS BY A USER EQUIPMENT (UE)

TECHNICAL FIELD

Aspects of the present disclosure relate generally to wireless communication systems, and more particularly, to wireless communication systems that use a discontinuous reception (DRX) mode for sidelink communications.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME EXAMPLES

In some aspects of the disclosure, a first user equipment (UE) for wireless communication includes a transmitter configured to transmit, to a second UE, a request associated with a sidelink discontinuous reception (DRX) configuration of the first UE for sidelink communication between the first UE and one or more UEs that are distinct from the first UE. The first UE further includes a receiver configured to receive, from the second UE based on the request, a message indicating one or more parameters associated with the sidelink DRX configuration. The transmitter is further configured to transmit, to the second UE based on the message, a response indicating one of acceptance of or rejection of at least one parameter of the one or more parameters.

In some other aspects of the disclosure, a method of wireless communication performed by a first UE includes transmitting, to a second UE, a request associated with a sidelink DRX configuration of the first UE for sidelink communication between the first UE and one or more UEs that are distinct from the first UE. The method further includes receiving, from the second UE based on the request, a message indicating one or more parameters associated with the sidelink DRX configuration. The method further includes transmitting, to the second UE based on the message, a response indicating one of acceptance of or rejection of at least one parameter of the one or more parameters.

In some other aspects of the disclosure, an apparatus for wireless communication includes a receiver configured to receive, from a first UE, a request associated with a sidelink DRX configuration of the first UE for sidelink communication between the first UE and one or more UEs that are distinct from the first UE. The apparatus further includes a transmitter configured to transmit, to the first UE based on the request, a message indicating one or more parameters associated with the sidelink DRX configuration. The receiver is further configured to receive, from the first UE based on the message, a response indicating one of acceptance of or rejection of at least one parameter of the one or more parameters.

In some other aspects of the disclosure, a method of wireless communication includes receiving, from a first UE, a request associated with a sidelink DRX configuration of the first UE for sidelink communication between the first UE and one or more UEs that are distinct from the first UE. The method further includes transmitting, to the first UE based on the request, a message indicating one or more parameters associated with the sidelink DRX configuration. The method further includes receiving, from the first UE based on the message, a response indicating one of acceptance of or rejection of at least one parameter of the one or more parameters.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 6 is a flow diagram illustrating an example of a method of wireless communication performed by a UE according to some aspects of the disclosure.

FIG. 7 is a flow diagram illustrating another example of a method of wireless communication performed by a UE according to some aspects of the disclosure.

DETAILED DESCRIPTION

Figure 1:
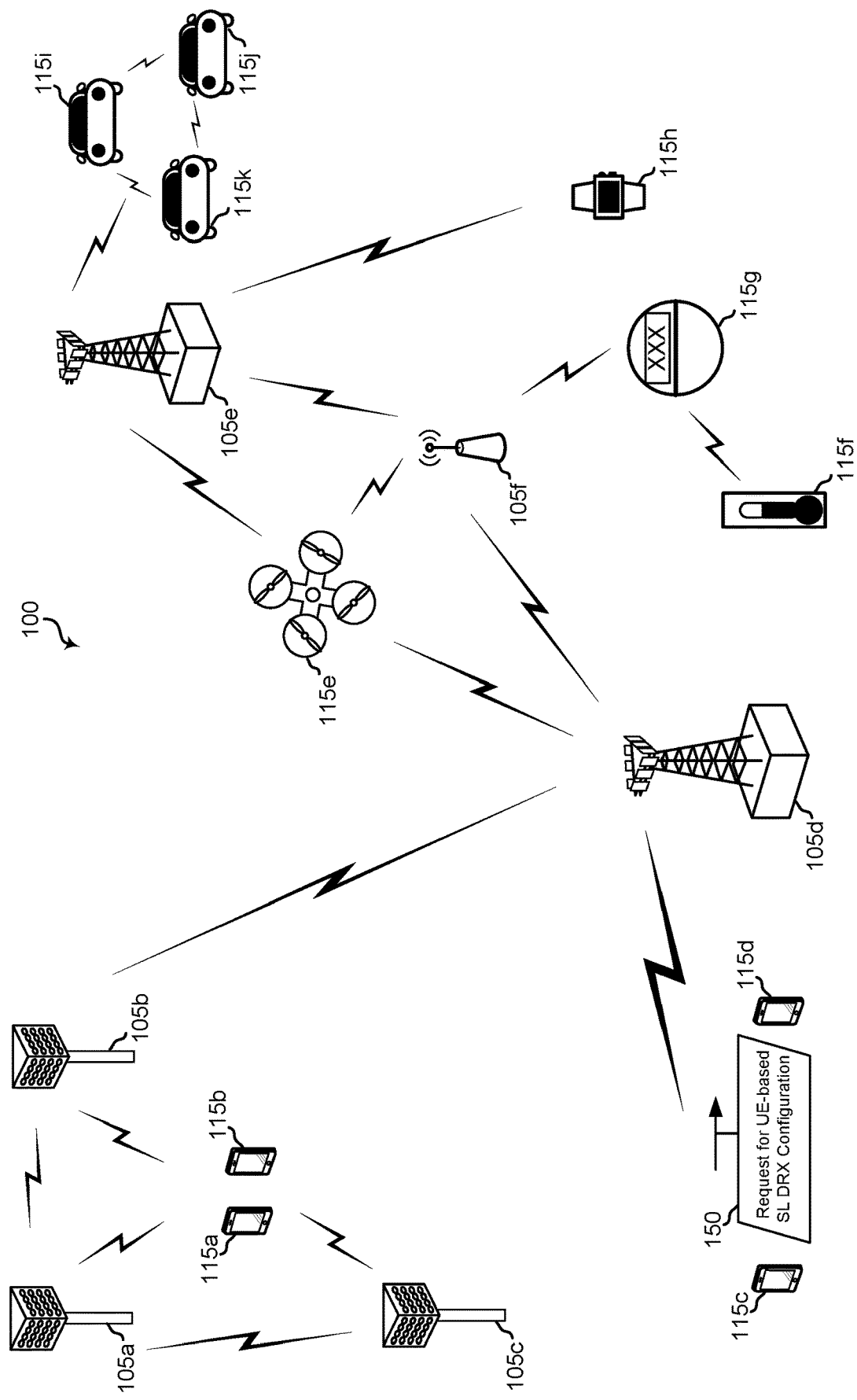
FIG. 1 is a block diagram illustrating details of an example wireless communication system according to some aspects of the disclosure.

Some wireless communication protocols may specify that devices may operate based on a discontinuous reception (DRX) configuration to reduce power consumption. For example, a user equipment (UE) may operate based on a DRX configuration that specifies a DRX-on interval (during which the UE may be awake to transmit or receive messages) and a DRX-off interval (during which the UE may operate according to a low-power mode to reduce power consumption). In some examples, parameters of the DRX configuration (such as the DRX-on interval and the DRX-off interval) may be specified by a base station that communicates with the UE.

Some wireless communication protocols support sidelink communications in which a UE may directly communicate with another UE via a sidelink connection, such as a sidelink unicast connection between the UEs. In some such examples, the UE may negotiate parameters of a sidelink DRX configuration with the other UE (e.g., instead of a base station selecting the parameters of the DRX mode). Further, a sidelink DRX configuration may be "directional." To illustrate, a sidelink DRX configuration of a first UE may specify a receive-on (RX-on) interval during which the first UE may monitor for messages, and a sidelink DRX configuration of a second UE may specify another receive-on (RX-on) interval during which the second UE may monitor for messages.

As the number of sidelink connections associated with a UE increases, negotiation of the DRX mode may become difficult. To illustrate, if the UE has sidelink connections with multiple UEs, the UE may attempt to reduce power consumption by negotiating a DRX configuration with the multiple UEs. To negotiate the DRX configuration, the UE may communicate with one UE to verify or establish the DRX configuration, and then may communicate with another UE to verify or establish the DRX configuration, and so on. As a result, as a number of sidelink connections increases, negotiating a DRX configuration may involve a transmitting and receiving relatively large number of configuration messages, which may increase power consumption and which may utilize extra wireless resources.

In addition, in some cases, a conflict may occur between DRX configurations of different UEs. For example, multiple UEs may attempt to negotiate the same (or overlapping) RX-on intervals. In some cases, scheduling of overlapping RX-on intervals may be associated with interference and dropped communications in some cases (e.g., due to multiple concurrent transmissions to UEs that share an overlapping RX-on interval). Further, in some circumstances, some UEs may have a half-duplex (HD) capability and may be unable to transmit while monitoring for messages during an RX-on interval. As a result, if such UEs share the same RX-on interval, the UEs may be unable to communicate with one another.

In some aspects of the disclosure, a UE may serve as a DRX configuration manager that performs scheduling or coordination of DRX configurations for other UEs, such as a group of UEs within a particular region (e.g., within a threshold geographic distance of the UE). In some implementations, UEs within the particular region may communicate with the DRX configuration manager (such as by sending a DRX configuration request with DRX configuration information) and may receive a DRX configuration (or one or more parameters associated with the DRX configuration) from the DRX configuration manager. As a result, the DRX configuration manager may maintain data indicating DRX configurations of multiple UEs, which may enable the DRX configuration manager to schedule and coordinate DRX configurations for the UEs.

In some examples, use of a DRX configuration manager may increase efficiency in a wireless communication system or may reduce or avoid certain DRX scheduling conflicts. For example, because the DRX configuration manager may maintain information indicating DRX configurations of a group of UEs, a UE may negotiate a DRX configuration with the DRX configuration manager instead of separately negotiating the DRX configuration with each UE of the group of UEs. As a result, use of the DRX configuration manager may reduce a number of messages transmitted to negotiate a DRX configuration. As another example, in some circumstances, the DRX configuration manager may reduce or avoid certain conflicts between DRX configurations, such as by avoiding scheduling of overlapping RX-on intervals. As a result, interference and dropped communications may be reduced or avoided in some cases.

To further illustrate, one or more aspects described herein be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km^2), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km^2), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system according to one or more aspects. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105*d* and 105*e* are regular macro base stations, while base stations 105*a*-105*c* are macro base stations enabled with one of 3 dimension (3D), full dimension (FD), or massive MIMO. Base stations 105*a*-105*c* take advantage of their higher dimension MIMO capabilities to exploit 3D beamforming in both elevation and azimuth beamforming to increase coverage and capacity. Base station 105*f* is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, a gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like.

UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105a-105c serve UEs 115a and 115b using 3D beamforming and coordinated spatial techniques, such as coordinated multi-point (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such as UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD communications or low-latency FDD communications, such as in a vehicle-to-vehicle (V2V) mesh network between UEs 115i-115k communicating with macro base station 105e.

In some examples, a UE 115 may communicate with another UE 115 via a sidelink connection. An example of a sidelink connection is a sidelink unicast connection. In some aspects, a UE 115 may transmit, to another UE 115, a request 150 for UE-based sidelink (SL) discontinuous reception (DRX) configuration, as described further below. For example, FIG. 1 depicts that the UE 115c may transmit the request 150 to the UE 115d.

Figure 2:
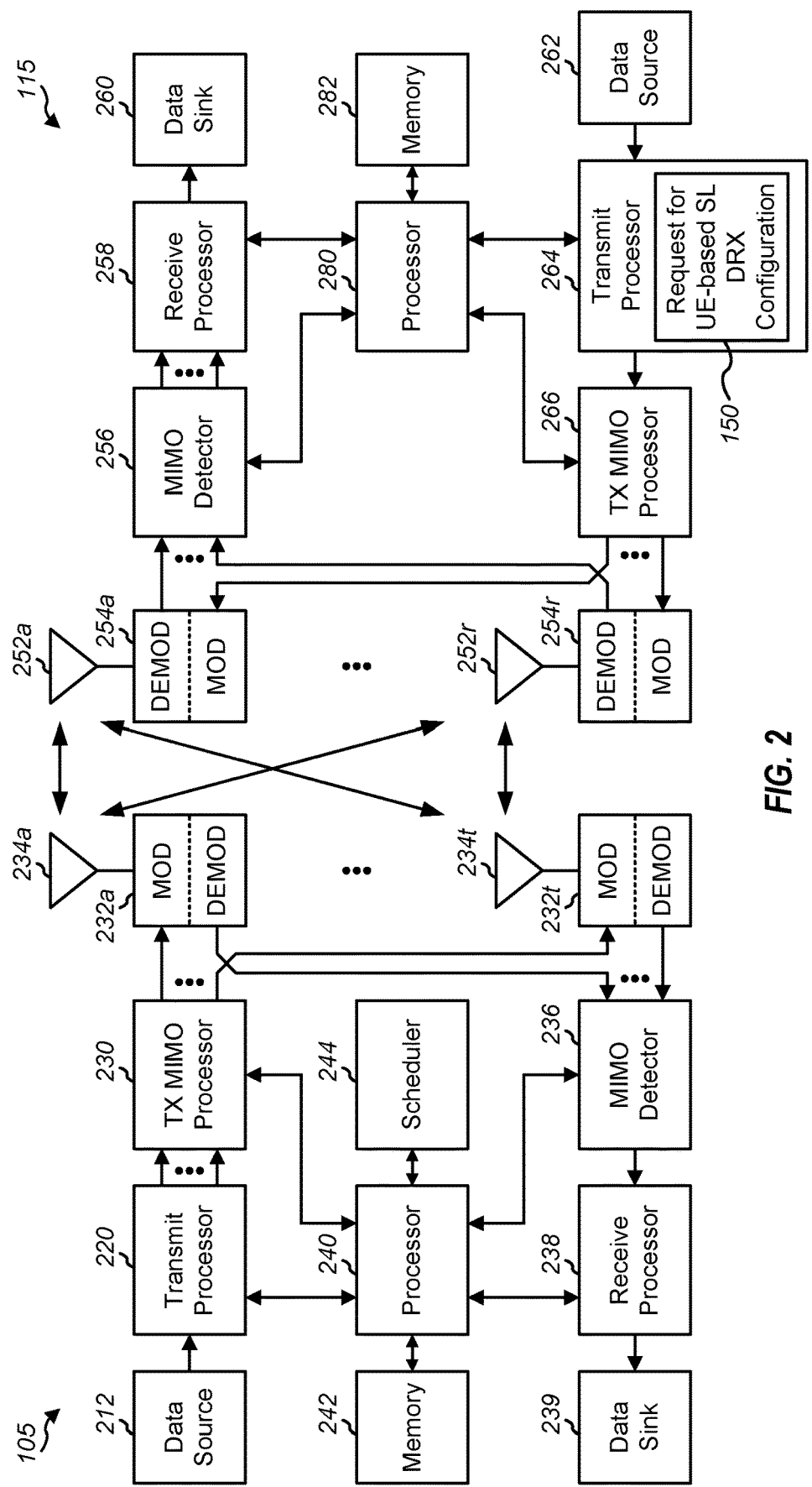
FIG. 2 is a block diagram illustrating examples of a base station and a user equipment (UE) according to some aspects of the disclosure.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105f in FIG. 1, and UE 115 may be UE 115c or 115d operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from processor 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to processor 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from processor 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to processor 240.

Processors 240 and 280 may direct the operation at base station 105 and UE 115, respectively. Processor 280 or other processors and modules at UE 115 may perform or direct the execution of one or more operations described herein. In some examples, the processor 280 or the transmit processor 264 may initiate, perform, or control transmission of the request 150 to another UE 115. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

Figure 3A:
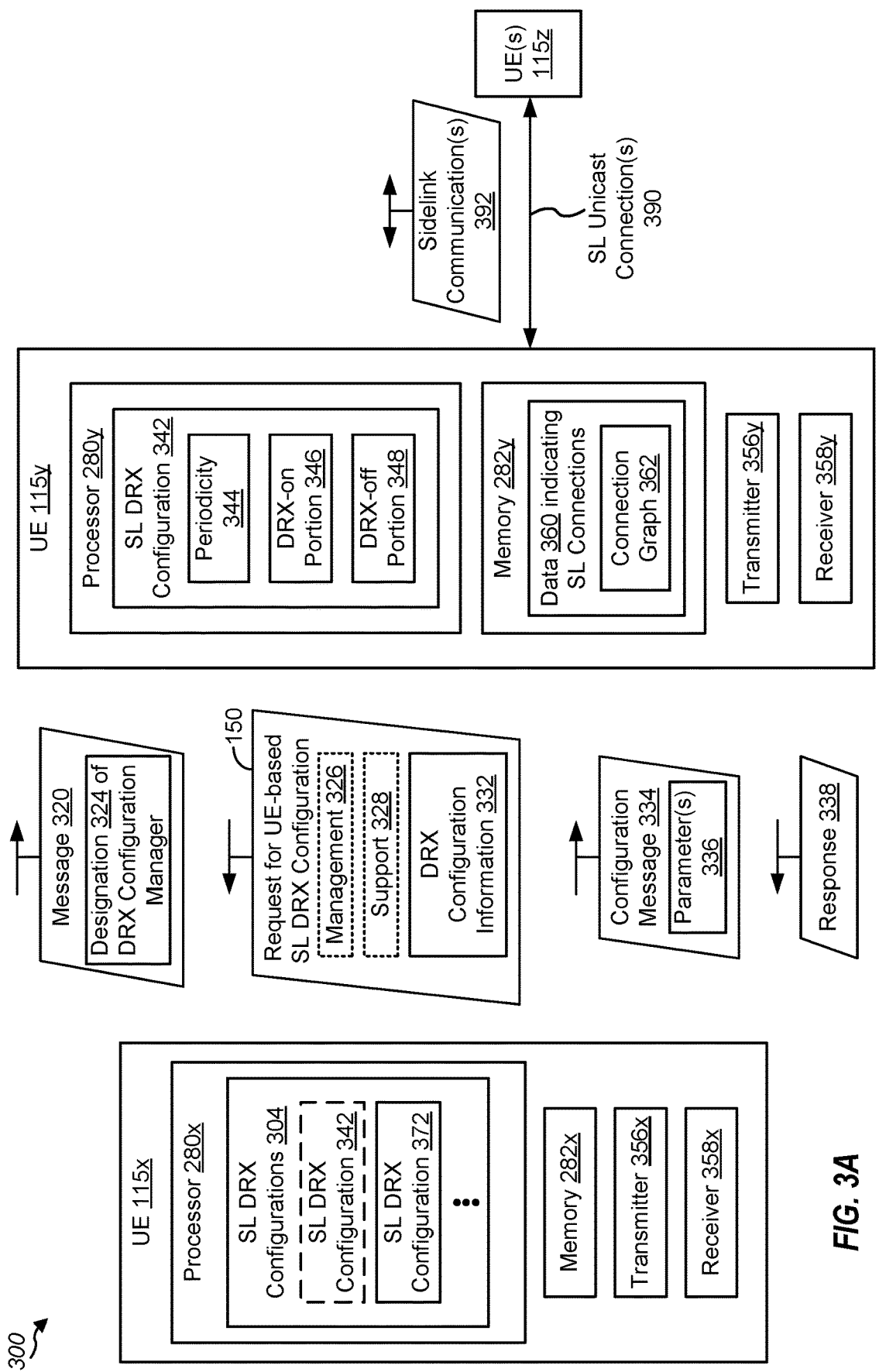
FIG. 3A is a block diagram illustrating an example of a wireless communication system according to some aspects of the disclosure.

FIG. 3A is a block diagram illustrating an example of a wireless communication system 300 according to some aspects of the disclosure. The wireless communication system 300 may include multiple UEs, such as a UE 115x, a UE 115y, and one or more UEs 115z.

Each of the UEs 115x-z may include one or more processors (such as the processor 280), a memory (such as the memory 282), a transmitter, and a receiver. For example, the UE 115x may include a processor 280x, a memory 282x, a transmitter 356x, and a receiver 358x. As another example, the UE 115y may include a processor 280y, a memory 282y, a transmitter 356y, and a receiver 358y. In some examples, the transmitters 356x and 356y and the receivers 358x and 358y may include one or more components described with reference to FIG. 2, such as one or more of the modulator/demodulators 254a-r, the MIMO detector 256, the receive processor 258, the transmit processor 264, or the TX MIMO processor 266. In some implementations, the transmitter 356x and the receiver 358x may be integrated in one or more transceivers of the UE 115x, and the transmitter 356y and the receiver 358y may be integrated in one or more transceivers of the UE 115y.

The transmitters 356x and 356y may transmit reference signals, synchronization signals, control information, and data to one or more other devices, and the receivers 358x and 358y may receive reference signals, control information, and data from one or more other devices. For example, in some implementations, the transmitter 356x may transmit signaling, control information, and data to one or more of the base station 105 or the UE 115y, and the receiver 358x may receive signaling, control information, and data from one or more of the base station 105 or the UE 115y. As another example, in some implementations, the transmitter 356y may transmit signaling, control information, and data to one or more of the base station 105 or the UE 115x, and the receiver 358y may receive signaling, control information, and data from one or more of the base station 105 or the UE 115x.

In some implementations, one or more of the transmitter 356x, the transmitter 356y, the receiver 358x, or the receiver 358*y* may include an antenna array. The antenna array may include multiple antenna elements that perform wireless communications with other devices. In some implementations, the antenna array may perform wireless communications using different beams, also referred to as antenna beams. The beams may include transmit beams and receive beams. To illustrate, the antenna array may include multiple independent sets (or subsets) of antenna elements (or multiple individual antenna arrays), and each set of antenna elements of the antenna array may be configured to communicate using a different respective beam that may have a different respective direction than the other beams. For example, a first set of antenna elements of the antenna array may be configured to communicate via a first beam having a first direction, and a second set of antenna elements of the antenna array may be configured to communicate via a second beam having a second direction. In other implementations, the antenna array may be configured to communicate via more than two beams. In some implementations, one or more sets of antenna elements of the antenna array may be configured to concurrently generate multiple beams, for example using multiple RF chains. A set (or subset) of antenna elements may include multiple antenna elements, such as two antenna elements, four antenna elements, ten antenna elements, twenty antenna elements, or any other number of antenna elements greater than two. Although described as an antenna array, in other implementations, the antenna array may include or correspond to multiple antenna panels, and each antenna panel may be configured to communicate using a different respective beam.

Depending on the particular example, aspects described herein may be used in connection with a mode one ("Mode 1") sidelink resource allocation mode, a mode two ("Mode 2") sidelink resource allocation mode, one or more other modes, or a combination thereof. A mode one sidelink resource allocation operation may correspond to a centralized mode in which the base station 105 determines a resource allocation for a wireless communication by one or more of the UEs 115*x*, 115*y*. A mode two sidelink resource allocation operation may correspond to a distributed mode in which one or more of the UEs 115*x*, 115*y* are enabled to autonomously determine a resource allocation for a wireless communication (e.g., instead of receiving an indication of the resource allocation from the base station 105).

The wireless communication system 300 may use wireless communication channels, which may be specified by one or more wireless communication protocols, such as a 5G NR wireless communication protocol. To illustrate, the base station 105 may communicate with one or more of the UEs 115*x-z* using one or more downlink wireless communication channels (e.g., using one or more of a PDSCH or a PDCCH) and using one or more uplink wireless communication channels (e.g., using one or more of a PUSCH or a PUCCH). The UEs 115*x-z* may communicate with one another using one or more sidelink channels, such as one or more of a sidelink control channel (e.g., a PSCCH), a sidelink data channel (e.g., a PSSCH), or a sidelink feedback channel (e.g., a PSFCH).

During operation, the UEs 115*x-z* may establish sidelink wireless connections with one another to enable communication of wireless signals. Examples of sidelink wireless connections include sidelink groupcast connections, sidelink multicast connections, and sidelink unicast connections. As a non-limiting illustrative example, the UEs 115*x-z* may correspond to vehicles that communicate based on a vehicle-to-everything (V2X) wireless communication protocol and may use the sidelink unicast connections to transmit and receive traffic information, emergency alerts, positioning information, and other signals. Alternatively or in addition, the UEs 115*x-z* may be included in one or more other wireless communication networks. As a non-limiting illustrative example, the UEs 115*x-z* may correspond to sensors of an Internet-of-Things (IoT) sensor network. To further illustrate, the UE 115*y* may transmit and receive wireless communications with the one or more UEs 115*z* via one or more SL unicast connections 390.

Transmitting and receiving wireless communications consumes power of the UEs 115*x-z*. To reduce power consumption, one or more of the UEs 115*x-z* may operate based on a discontinuous reception (DRX) mode of operation. During the DRX mode of operation, a UE 115 may operate based on a DRX-off mode (e.g., a sleep mode) to conserve power for a portion of a DRX cycle. The UE 115 may wake to operate based on a DRX-on mode to monitor for messages during another portion of the DRX cycle.

Figure 3B:
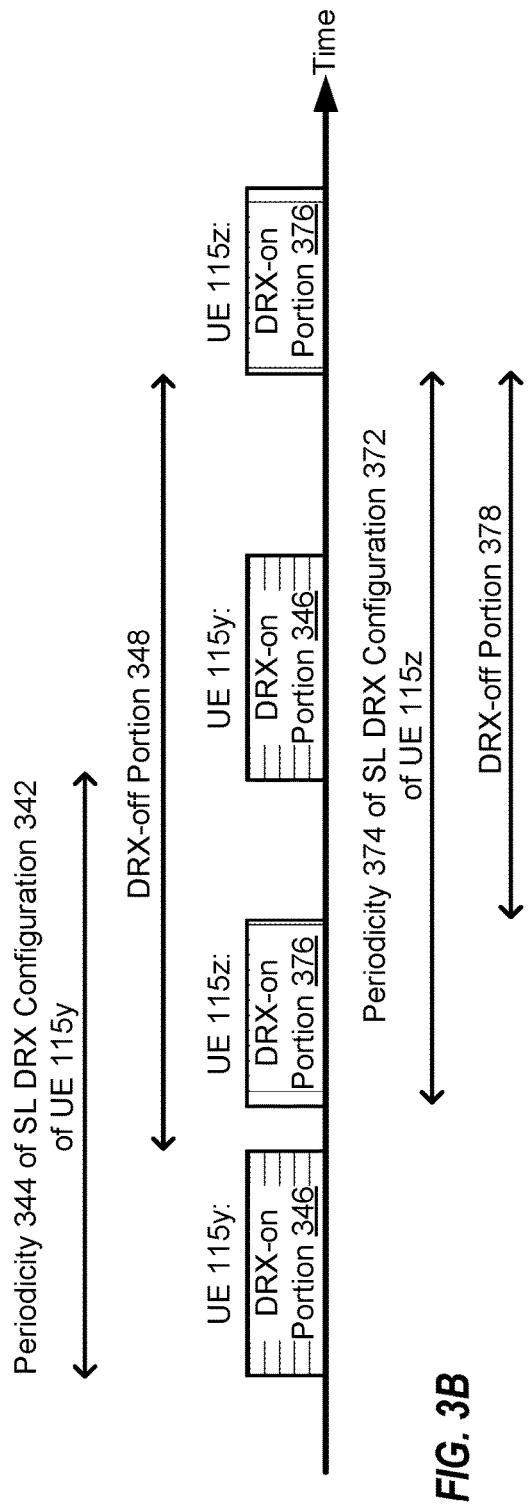
FIG. 3B depicts some aspects of examples of sidelink (SL) discontinuous reception (DRX) configurations according to some aspects of the disclosure.

To illustrate, FIG. 3B depicts some aspects of examples of sidelink (SL) DRX configurations according to some aspects of the disclosure. The SL DRX configurations may include an SL DRX configuration 342 of the UE 115*y* and an SL DRX configuration 372 of a UE of the one or more UEs 115*z*. The SL DRX configuration 342 may be associated with a periodicity 344 of a DRX cycle, a DRX-on portion 346 of the DRX cycle, and a DRX-off portion 348 of the DRX cycle. In some examples, the DRX-on portion 346 may include or correspond to an RX-on interval during which the UE 115*y* may monitor the one or more SL unicast connections 390 for messages from other UEs. As an example, the UE 115*z* may transmit one or more messages to the UE 115*y* during the RX-on interval, and the UE 115*z* may receive the one or more messages during the RX-on interval. During the DRX-off portion 348, the UE 115*y* may operate according to a sleep mode that may be associated with a power consumption that is less than a power consumption of the UE 115*y* during the DRX-on portion 346.

The SL DRX configuration 372 may be associated with a periodicity 374, a DRX-on portion 376, and a DRX-off portion 378. In some examples, the DRX-on portion 376 may include an RX-on interval during which the UE 115*z* may monitor for messages from other UEs. Alternatively, the SL DRX configuration 372 may contain a configured TX-on interval, during which the UE 115*z* may transmit one or more messages to other UEs. In some examples, such a TX-on interval configuration may be part of an SL discontinuous transmission (DTX) configuration. In another example, the SL DRX configuration 372 may contain only an RX-on internal, which may correspond to an allowed TX-on period for other UEs interested in transmitting one or messages to the UE 115*z*. During the DRX-off portion 378, the UE 115*z* may operate according to a sleep mode that may be associated with a power consumption that is less than a power consumption of the UE 115*z* during the DRX-on portion 376.

In some circumstances, a conflict may occur between the SL DRX configuration 342 and the SL DRX configuration 372. For example, if at least a portion of a DRX-on portion 376 occurs during a DRX-on portion 346 (also referred to herein as an overlap), then a transmission conflict from other UEs may occur. For example, one or more messages transmitted to the UE 115*y* by one or more other UEs may cause interference to the UE 115*z* while receiving one or more messages from at least one other UE (or vice versa) during the overlapping DRX-on portions. In some cases, such a transmission conflict may reduce ability of the UEs 115*y* and 115z to communicate via sidelink communication by causing interference or dropped communications.

Additionally, for a UE having a half-duplex (HD) capability, the UE may be unable to transmit during the DRX-on interval associated with the UE (e.g., to enable the UE to listen for messages during the DRX-on interval). In that case, if another UE (e.g., another UE with HD capability) is also configured with the same DRX-on period as the UE (and thus the UEs have overlapping DRX-on intervals), each of the UEs may need to monitor for messages during the same DRX-on period and may be unable to transmit to one another. In such examples, the two UEs may be unable to communicate with each other.

In some wireless communication protocols, the UE 115y and the UE 115z may negotiate the SL DRX configurations 342, 372 with one another to reduce or avoid conflicts, such as transmission conflicts that result from overlapping DRX-on intervals. In some circumstances, negotiation of the SL DRX configurations consumes processing cycles, wireless resources, and device power. For example, as the number of sidelink connections associated with a UE increases, negotiation of each SL DRX configuration with each UE may result in a relatively large number of control signaling (such as configuration messages or other signaling overhead) transmitted in the wireless communication network, which consumes processing cycles, wireless resources, and device power.

In some aspects of the disclosure, a UE may serve as a DRX configuration manager (also referred to herein as a DRX group leader) to perform one or both of management or support of SL DRX configurations of UEs, which may reduce an amount of negotiation (and a number of messages) between UEs to establish the SL DRX configurations. To illustrate, referring again to FIG. 3A, the UE 115x may transmit a message 320 indicating a designation 324 of the DRX configuration manager. In some examples, the designation 324 may indicate the UE 115x. In such examples, the message 320 may indicate that the UE 115x "volunteers" to serve as the DRX configuration manager. Alternatively or in addition, the designation 324 may indicate one or more other UEs 115. For example, the designation 324 may indicate that the UE 115x "nominates" another UE 115 to serve as the DRX configuration manager. In some examples, the message 320 may correspond to one or more of a broadcast message, a groupcast message, a master information block (MIB) associated with the UE 115x, or a sidelink control information (SCI) message.

One or more UEs 115 may receive the message 320 and may request management or support based on the message 320. To illustrate, in some examples, the UE 115y may receive the message 320 from the UE 115x and may transmit the request 150 to the UE 115x based on the message 320. In some examples, the request 150 corresponds to or is included in a sidelink DRX request message, a sidelink UE capability message, a sidelink UE assistance information message, or another message.

In some examples, the UE 115y transmits the request 150 based on the message 320 and further based on a determination that the UE 115y is to operate based on the SL DRX configuration 342. During the DRX-on portion 346 of the SL DRX configuration 342, the UE 115y may communicate with any of the one or more UEs 115z via the one or more SL unicast connections 390.

In some examples, the request 150 may indicate or correspond to a request for the UE 115x to perform management 326 for the UE 115y, such as by selecting the SL DRX configuration 342 for the UE 115y. In some other examples, the request 150 may indicate or correspond to a request for the UE 115x to perform support 328 for the UE 115y, such as by confirming the SL DRX configuration 342 for the UE 115y. In some such examples, the request 150 may indicate the SL DRX configuration 342 (or one or more parameters associated with the SL DRX configuration 342), and the UE 115x may perform the support 328 by accepting or rejecting the SL DRX configuration 342 (or one or more parameters associated with the SL DRX configuration 342).

To further illustrate, the request 150 may indicate DRX configuration information 332. In some examples, the UE 115x may perform the management 326 or support 328 for the UE 115y based on the DRX configuration information 332. In some implementations, the request 150 (or the DRX configuration information 332) may indicate one or more of identification (ID) information of the one or more UEs 115z, capability information of the one or more UEs 115z, quality of service (QoS) information associated with the UE 115y, power management information associated with the UE 115y, or sidelink DRX information associated with the one or more UEs 115z. In some examples, the DRX configuration 332 may indicate a duplex type of the UE 115y, such as whether the UE 115y supports full duplex (FD) communications or half duplex (HD) communications, as illustrative examples.

The UE 115x may receive the request 150 and may determine one or more parameters 336 based on the request 150. In some implementations, the one or more parameters 336 may include one or more of the periodicity 344, a duration of the DRX-on portion 346, a duration of a DRX-off portion 348, a timing of the DRX-on portion 346 within a DRX cycle (e.g., a set of time slots associated with the DRX-on portion 346), or a timing of the DRX-off portion 348 within the DRX cycle (e.g., a set of time slots associated with the DRX-off portion 348). To further illustrate, in some examples, the UE 115x may determine the one or more parameters 336 based on the DRX configuration information 332 indicated by the request 150, such as one or more of a capability of the UE 115y, quality of service (QoS) information associated with the UE 115y, power management information associated with the UE 115y, sidelink DRX information associated with the one or more UEs 115z, or sidelink DRX information associated with at least one other UE within a threshold proximity of the UE 115y.

Alternatively or in addition, in some implementations, the UE 115x may select the one or more parameters 336 based on SL DRX configurations associated with one or more other UEs 115, such as the one or more UEs 115z. To illustrate, if the UE 115x has previously configured the UE 115z of FIG. 3B with the SL DRX configuration 372 (e.g., based on a request from the UE 115z), then the UE 115x may select the one or more parameters 336 based on the SL DRX configuration 372 (e.g., so that the DRX-on portion 346 does not overlap the DRX-on portion 376, as depicted in the example of FIG. 3B). In some other examples, the UE 115x may determine the SL DRX configuration 372 after determining the one or more parameters 336. In some such examples, the UE 115x may select default or random values to determine the one or more parameters 336.

In some examples, the UE 115x selects the one or more parameters 336 to reduce or avoid a conflict, such as a transmission conflict that results from overlapping DRX-on intervals. To illustrate, selecting the one or more parameters 336 may include scheduling an interval of the DRX-on portion 346 so that the interval does not overlap with one or more other DRX-on intervals associated with the one or more UEs 115z. For example, the UE 115x may access the SL DRX configurations 304 to identify a particular time interval that does not include an interval associated with the one or more UEs 115z and may schedule the interval of the DRX-on portion 346 during the particular time interval. The one or more parameters 336 may include or correspond to the interval of the DRX-on portion 346 that allows the transmission.

The UE 115x may transmit a configuration message 334 to the UE 115y based on the request 150. The configuration message 334 may indicate the one or more parameters 336. In some examples, the configuration message 334 corresponds to a radio resource control (RRC) reconfiguration complete sidelink message that is transmitted to the UE 115y, to the one or more UEs 115z, and to at least one other UE within a threshold proximity of the UE 115y.

In some examples, the configuration message 334 configures the UE 115x with the one or more parameters 336 (e.g., where the one or more parameters 336 correspond to the SL DRX configuration 342 selected by the UE 115x). In such examples, the request 150 may be for the UE 115x to perform the management 326 of the SL DRX configuration 342 by determining the one or more parameters 336 (or the SL DRX configuration 342) on behalf of the UE 115y. In some other examples, the UE 115y may determine the SL DRX configuration 342 based on the one or more parameters 336. In such examples, the request 150 may be or the UE 115x to perform the support 328 by enabling the UE 115y to determine the SL DRX configuration 342 based on the one or more parameters 336.

The UE 115y may receive the configuration message 334 from the UE 115x. In some implementations, the UE 115y may determine whether to accept or reject the one or more parameters 336, such as based on one or more of a capability of the UE 115y, one or more connections with other UEs, or the connection with the cellular network (e.g., a Uu interface).

The UE 115y may transmit a response 338 to the UE 115x based on the configuration message 334. The response 338 may indicate acceptance or rejection of at least one parameter the one or more parameters 336. In some examples, the response 338 indicates acceptance of the one or more parameters 336. In such examples, the UE 115y may perform one or more sidelink communications 392 with the one or more UEs 115z via the one or more SL unicast connections 390 and based on the SL DRX configuration 342. For example, the UE 115y may transmit data to or receive data from the one or more UEs 115z via the one or more SL unicast connections 390 during the DRX-on portion 346 and may operate according to a sleep mode during the DRX-off portion 348.

In some other examples, the response 338 may indicate rejection of at least one parameter the one or more parameters 336. In such examples, the UE 115x may transmit to the UE 115y a second configuration message indicating one or more second parameters associated with the SL DRX configuration 342. The UE 115y may transmit, to the UE 115x, a second response to the second configuration message indicating one of acceptance of the one or more parameters or rejection of at least one parameter of the one or more second parameters.

In some examples, the UE 115x is selected as the DRX configuration manager of a group of UEs that includes the UE 115y and the one or more UEs 115z. The group of UEs may optionally include the UE 115x. In some examples, the UE 115x is selected as the DRX configuration manager based on sidelink connections associated with the group of UEs. In some examples, the sidelink connections may include or correspond to the one or more SL unicast connections 390. To illustrate, one or more UEs 115 (such as the UE 115y) may generate data 360 representing a connection graph 362 that is based on the sidelink connections and may select the UE 115x as the DRX configuration manager based on the connection graph 362. In some examples, the processor 280y (or another processor) may be configured to perform operations described with reference to selection of the DRX configuration manager, such as generating the connection graph 362 and selecting the UE 115x as the DRX configuration manager based on the connection graph 362.

Figure 3C:
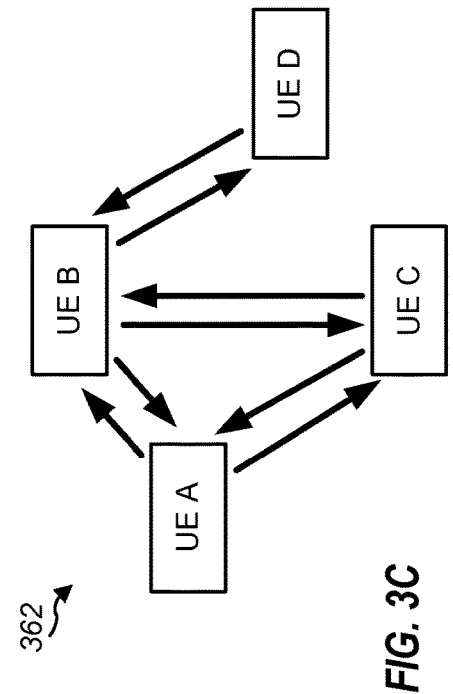
FIG. 3C depicts an illustrative example of a connection graph according to some aspects of the disclosure.

To further illustrate, FIG. 3C depicts an illustrative example of the connection graph 362 according to some aspects of the disclosure. The connection graph may be based on sidelink connections between UEs A, B, C, and D. In some examples, UE B may correspond to the UE 115x, UE A may correspond to the UE 115y, and UEs C and D may be included in or may correspond to the one or more UEs 115z. Each arrow depicted in FIG. 3C may represent a sidelink connection.

In the example of FIG. 3C, UE B is associated with the most sidelink connections (six sidelink connections), which is more than the number of sidelink connections associated with UEs A and B (four sidelink connections each) and the number of sidelink connections associated with UE D (two sidelink connections). As a result, UE B may be selected as the DRX configuration manager based on the number of sidelink connections associated with UE B exceeding the number of sidelink connections associated with the UEs A, C, and D.

Referring again to FIG. 3A, in some other examples, a UE 115 may be selected as the DRX configuration manager based on a groupcast connection. To illustrate, the UE 115y may form a groupcast connection with the UE 115x and the one or more other UEs 115z. After forming the groupcast connection, any UE 115 associated with the groupcast connection may be selected as the DRX configuration manager based on the groupcast connection. For example, the UE 115x may be randomly or pseudo-randomly selected from among UEs of the groupcast connection as the DRX configuration manager. In some other examples, the DRX configuration manager may be selected from among UEs of the groupcast connection as the DRX configuration manager using one or more other techniques, such as using a round robin technique, as an illustrative example.

Alternatively or in addition to using one or more of the connection graph 362 or the groupcast connection, in some examples, the DRX configuration is selected based on one or more of an announcement message from the second UE, a sidelink UE information message from the second UE, a location of the second UE, a number of sidelink connections associated with the second UE, or a capability of the second UE. For example, the UE 115x may be selected as the DRX configuration manager based on one or more of an announcement message transmitted by the UE 115x, a sidelink UE information message transmitted by the UE 115x, a location of the UE 115x, a number of sidelink connections associated with the UE 115x, or a capability of the UE 115x. In some examples, the message 320 may correspond to the announcement message or the sidelink information message.

In some examples, UEs 115 may volunteer and may "vote" for a DRX configuration manager using announcement messages. To illustrate, the UE 115y may receive a first announcement message from a particular UE 115 indicating the particular UE as the DRX configuration manager (e.g., that particular UE 115 "volunteers" to serve as the DRX configuration manager). Based on the first announcement message, the UE 115y may transmit a first broadcast message. The first broadcast message may indicate one of acceptance of or rejection of the particular UE as the DRX configuration manager. In some examples, the UE 115y may receive a second announcement message nominating the UE 115x as the DRX configuration manager instead of the particular UE. In some examples, the second announcement may correspond to the message 320 (e.g., where the UE 115x "volunteers" as the DRX configuration manager). In some other examples, the second announcement message may be transmitted by another device, such as by one of the one or more UEs 115z. Based on the second announcement message, the UE 115y may transmit a second broadcast message indicating one of acceptance of or rejection of the UE 115x as the DRX configuration manager.

In some cases, the DRX configuration manager may be reselected. For example, reselection of the DRX configuration manager may be performed based on one or more of a sidelink communication topology change, a sidelink connection change, or a retirement message received from the DRX configuration manager. To further illustrate, the UE 115x may transmit a retirement message indicating that the UE 115x "retires" from serving as the DRX configuration manager, and another UE 115 may volunteer or may be nominated to serve as the DRX configuration manager. As another example, if a number of the one or more SL unicast connections 390 increases to be greater than a number of SL unicast connections associated with the UE 115x, reselection of the DRX configuration manager may include selecting the UE 115y (e.g., instead of the UE 115x) to serve as the DRX configuration manager.

Figure 4:
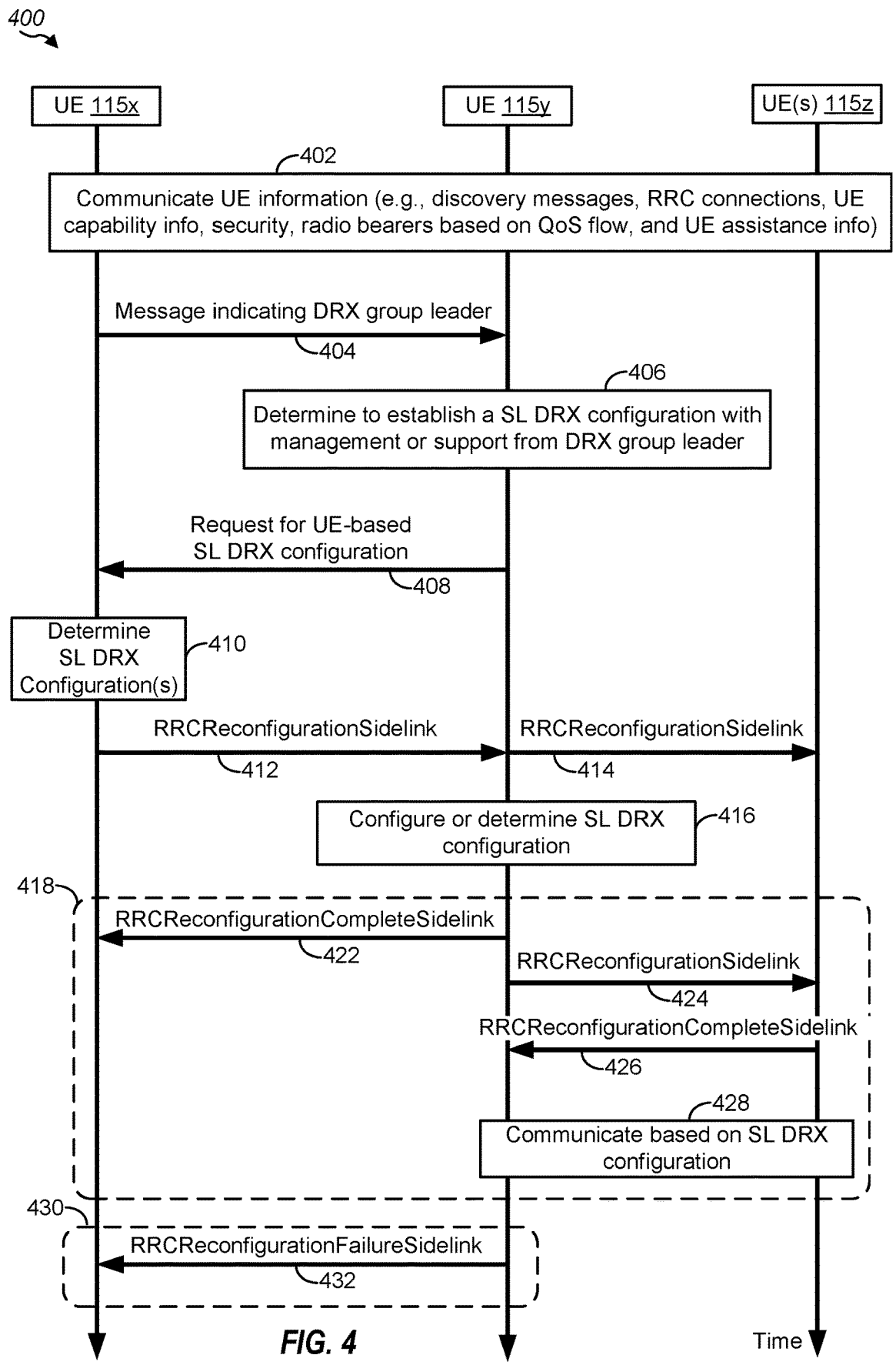
FIG. 4 is a diagram illustrating examples of operations that may be performed by a wireless communication system, such as by the wireless communication system of FIG. 3A, according to some aspects of the disclosure.

FIG. 4 is a diagram illustrating examples of operations 400 that may be performed by a wireless communication system, such as by the wireless communication system 300, according to some aspects of the disclosure. In some examples, the operations 400 are performed by the UEs 115x-z.

The operations 400 may include communicating UE information, at 402. For example, the UE information may include or may indicate one or more a discovery message, an RRC connection, UE capability information, radio bearers based on QoS flow, or UE assistance information.

The operations 400 may further include transmitting, by the UE 115x to the UE 115y, a message indicating a DRX group leader (also referred to herein as a DRX configuration manager), at 404. For example, the message may correspond to the message 320. In some examples, the message 320 indicates (e.g., via the designation 324) the UE 115x as the DRX group leader. In some examples, the UE 115x transmits the message as a broadcast message via a broadcast transmission technique.

The UE 115y may determine to establish SL DRX configuration with management or support from the DRX group leader, at 406. For example, the UE 115y may determine, based on the one or more SL unicast connections 390, that the UE 115x is to perform the management 326 or support 328 of the SL DRX configuration 342.

The UE 115y may transmit a request for UE-based SL DRX configuration, at 408. For example, the UE 115y may transmit the request 150 to the UE 115x.

The UE 115x may determine one or more SL DRX configurations, at 410. For example, the one or more SL DRX configurations may include the SL DRX configuration 342.

The UE 115x may transmit an RRC reconfiguration sidelink message to the UE 115y, at 412. The RRC reconfiguration sidelink message may correspond to the configuration message 334 and may indicate the SL DRX configuration 342 (or the one or more parameters 336 associated with the SL DRX configuration 342). In some implementations, the UE 115x may also determine one or more respective SL DRX configurations associated with the one or more UEs 115z and may transmit one or more RRC reconfiguration sidelink messages indicating the one or more SL DRX configurations, at 414.

The operations 400 may further include configuring or determining a SL DRX configuration per the DRX group leader, at 416. For example, configuring or determining the SL DRX configuration may include accepting or rejecting the SL DRX configuration 342 (or the one or more parameters 336 associated with the SL DRX configuration 342) indicated by the DRX group leader.

In some examples, based on accepting the SL DRX configuration 342 (or the one or more parameters 336 associated with the SL DRX configuration 342), the UE 115y may perform one or more operations 418. The operations 418 may include transmitting an RRC reconfiguration complete sidelink message (e.g., the response 338) to indicate the acceptance, at 422. In some examples, the RRC reconfiguration complete sidelink message indicates the SL DRX configuration 342 adopted by the UE 115y (e.g., to indicate one or more parameters of the SL DRX configuration 342 selected by the UE 115y). The UE 115y may transmit an RRC reconfiguration sidelink message to the one or more UEs 115z, at 424, and may receive one or more respective RRC reconfiguration complete sidelink messages 426 from the one UEs 115z, at 426. The operations 418 may also include communicating based on the SL DRX configuration 342 (e.g., by performing the one or more sidelink communications 392), at 428.

In some other examples, based on rejecting the SL DRX configuration 342 (or the one or more parameters 336 associated with the SL DRX configuration 342), the UE 115y may perform one or more operations 430. The operations 418 may include transmitting an RRC reconfiguration failure sidelink message (e.g., the response 338) to indicate the rejection, at 432. In some implementations, the RRC reconfiguration failure sidelink message may indicate one or more requested parameters of a second SL DRX configuration for the UE 115y. In some examples, the one or more operations 430 may further include receiving, from the UE 115x, a second RRC reconfiguration sidelink message indicating the second SL DRX configuration (or another SL DRX configuration) and may further include accepting or rejecting the second SL DRX configuration.

Figure 5:
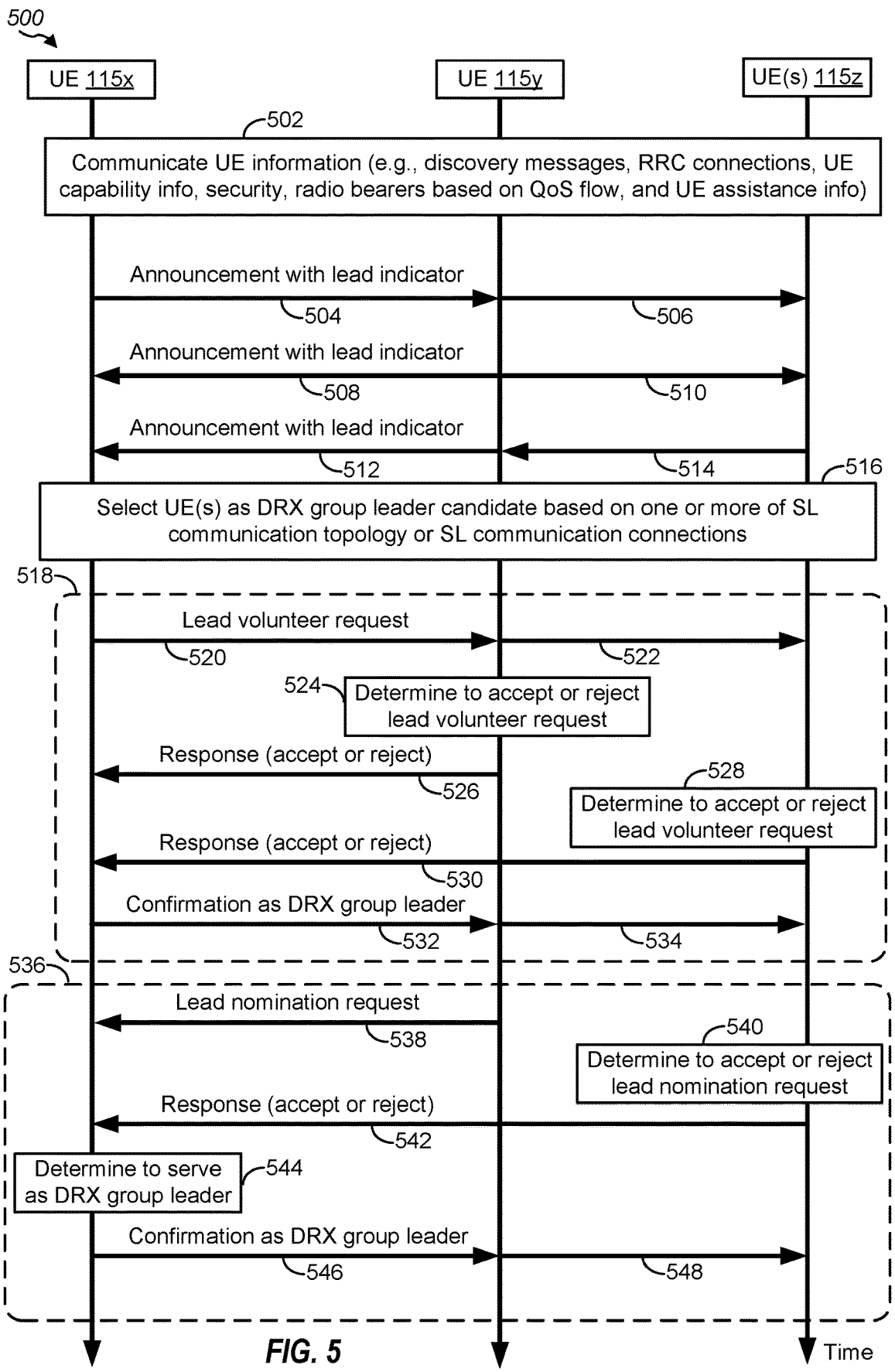
FIG. 5 is a diagram illustrating examples of operations that may be performed by a wireless communication system, such as by the wireless communication system of FIG. 3A, according to some aspects of the disclosure.

FIG. 5 is a diagram illustrating examples of operations 500 that may be performed by a wireless communication system, such as by the wireless communication system 300, according to some aspects of the disclosure. In some examples, the operations 500 are performed by the UEs 115x-z. In some examples, one or more messages described with reference to FIG. 5 may be transmitted as broadcast messages using a broadcast transmission technique.

The operations 500 may include communicating UE information, at 502. For example, the UE information may include or may indicate one or more a discovery message, an RRC connection, UE capability information, radio bearers based on QoS flow, or UE assistance information.

The operations 500 may further include communicating announcements with a lead indicator, a UE location, and a number of UE sidelink connections. For example, the UE 115x may transmit an announcement with a lead indicator, a UE location, and a number of UE sidelink connections to the UE 115y, at 504, and to the one or more UEs 115z, at 506. As another example, the UE 115y may transmit an announcement with a lead indicator, a UE location, and a number of UE sidelink connections to the UE 115x, at 508, and to the one or more UEs 115z, at 510. As an additional example, the one or more UEs 115z may transmit an announcement with a lead indicator, a UE location, and a number of UE sidelink connections to the UE 115x, at 512, and to the UE 115y, at 514.

In some implementations, each lead indicator includes or corresponds to a bit having a value indicating whether the respective UE 115 volunteers to serve as the DRX group leader. For example, a logic one value of the bit may indicate that the UE 115 volunteers to serve as the DRX group leader, and a logic zero value of the bit may indicate that the UE 115 does not volunteer to serve as the DRX group leader. The UE location may specify a geographic indication of the respective UE 115, and the number of UE sidelink connections may indicate a number (or cardinality) of sidelink connections associated with the respective UE 115.

The operations 500 may further include selecting one or more UEs 115 as DRX group leader candidates based on one or more of a sidelink communication topology or sidelink communication connections, at 516. For example, one or more UEs 115 may be selected as DRX group leader candidates based on one or more of a sidelink communication topology of the connection graph 362 or sidelink communication connections indicated by the connection graph 362. As a particular example, the one or more UEs 115 may be selected as DRX group leader candidates based on the connection graph 362 indicating that each of the one or more UEs 115 is associated with a threshold number of sidelink communication connections.

In some implementations, a DRX group leader candidate may volunteer to serve as the DRX group leader, as illustrated at 518. For example, the UE 115x may transmit a lead volunteer request to the UE 115y, at 520, and to the one or more UEs 115z, at 522. In some examples, the lead volunteer request may include one or more of a lead indicator or an ID of the UE 115x.

The UE 115y may determine whether to accept or reject the lead volunteer request, at 524, and may transmit a response indicating the acceptance or the rejection, at 526. The one or more UEs 115z may determine whether to accept or reject the lead volunteer request, at 528, and may each transmit a response indicating the acceptance or the rejection, at 530.

In some cases, a threshold number of the responses (or a threshold percentage of the responses) may indicate acceptance of the UE 115x as the DRX group leader. In some such examples, the UE 115x may transmit a confirmation as the DRX group leader to the UE 115y, at 532, and to the one or more UEs 115z, at 534. The confirmation may correspond to the message 320 and may include one or more of a lead indicator or an ID of the UE 115x. In some other cases, a threshold number of the responses (or a threshold percentage of the responses) may not indicate acceptance of the UE 115x as the DRX group leader. In some such examples, the UEs 115x-z may perform one or more other operations to determine a DRX group leader, such as by nominating a DRX group leader.

Alternatively or in addition to selecting the DRX group leader based on a volunteer request (e.g., as shown at 518), in some implementations, the UEs 115x-z may nominate the DRX group leader (e.g., as shown at 536). For example, the UE 115y may transmit to the UE 115x a lead nomination response nominating the UE 115x as the DRX group leader, at 538. The lead nomination response may include one or more of a lead indicator or an ID of the UE 115y. In some implementations, the one or more UEs 115z may receive the lead nomination request and may determine whether to accept or reject the lead nomination request, at 540. The one or more UEs 115z may transmit a response to the UE 115x indicating the acceptance or rejection, at 542.

The UE 115x may determine whether to serve as the DRX group leader, at 544. As a non-limiting illustrative example, the UE 115x may accept the nomination as the DRX group leader based on one or more criteria, such as based on whether a charge level of a battery of the UE 115x satisfies a threshold charge level. In some examples, the UE 115x may accept the nomination as the DRX group leader and may transmit a confirmation as the DRX group leader to the UE 115y, at 546, and to the one or more UEs, at 548. The confirmation may indicate one or more of a lead indicator or an ID of the UE 115x. In some other examples, the UE 115x may decline the nomination as the DRX group leader. In such examples, the UEs 115x-z may perform one or more other operations to select the DRX group leader, such as by selecting the DRX group leader on a volunteer basis (e.g., as shown at 518).

One or more aspects described herein may increase efficiency in a wireless communication system and may reduce or avoid certain DRX scheduling conflicts. For example, because the UE 115x may maintain information indicating the SL DRX configurations 304 of the one or more UEs 115z, the UE 115y may negotiate the SL DRX configuration 342 with the UE 115x instead of separately negotiating the SL DRX configuration 342 with each of the one or more UEs 115z. As a result, a number of messages transmitted to negotiate the SL DRX configuration 342 may be reduced. As another example, in some circumstances, the UE 115x may reduce or avoid certain conflicts between the SL DRX configurations 304, such as by avoiding scheduling of overlapping RX-on intervals. As a result, interference and dropped communications may be reduced or avoided in some cases.

FIG. 6 is a flow chart illustrating an example of a method 600 of wireless communication performed by a first UE according to some aspects of the disclosure. In some examples, the method 600 is performed by the UE 115y.

The method 600 includes transmitting, to a second UE, a request associated with a sidelink DRX configuration of the first UE for sidelink communication between the first UE and one or more UEs that are distinct from the first UE, at 602. For example, the UE 115y may transmit the request 150 associated with the SL DRX configuration 342 for sidelink communication between the UE 115y and the one or more UEs 115z. In some examples, the transmitter 356y is configured to transmit the request 150.

The method 600 further includes receiving, from the second UE based on the request, a message indicating one or more parameters associated with the sidelink DRX configuration, at 604. For example, the receiver 358y may be configured to receive the configuration message 334 indicating the one or more parameters 336.

The method 600 further includes transmitting, to the second UE based on the message, a response indicating one of acceptance of or rejection of at least one parameter of the one or more parameters, at 606. For example, the transmitter 356y may be configured to transmit the response 338, and the response 338 may indicate acceptance of or rejection of at least one parameter of the one or more parameters 336.

FIG. 7 is a flow chart illustrating an example of a method 700 of wireless communication performed by a UE according to some aspects of the disclosure. In some examples, the method 700 is performed by the UE 115x.

The method 700 includes receiving, from a first UE, a request associated with a sidelink DRX configuration of the first UE for sidelink communication between the first UE and one or more UEs that are distinct from the first UE, at 702. For example, the UE 115x may receive the request 150 from the UE 115y associated with the SL DRX configuration 342 for sidelink communication between the UE 115y and the one or more UEs 115z. In some examples, the receiver 358x is configured to receive the request 150.

The method 700 further includes transmitting, to the first UE based on the request, a message indicating one or more parameters associated with the sidelink DRX configuration, at 704. For example, the UE 115x may transmit the configuration message 334 to the UE 115y indicating the one or more parameters 336. In some examples, the transmitter 356x is configured to transmit the configuration message 334.

The method 700 further includes receiving, from the first UE based on the message, a response indicating one of acceptance of or rejection of at least one parameter of the one or more parameters, at 706. For example, receiver 358x may be configured to receive the response 338, and the response 338 may indicate acceptance of or rejection of at least one parameter of the one or more parameters 336.

Figure 8:
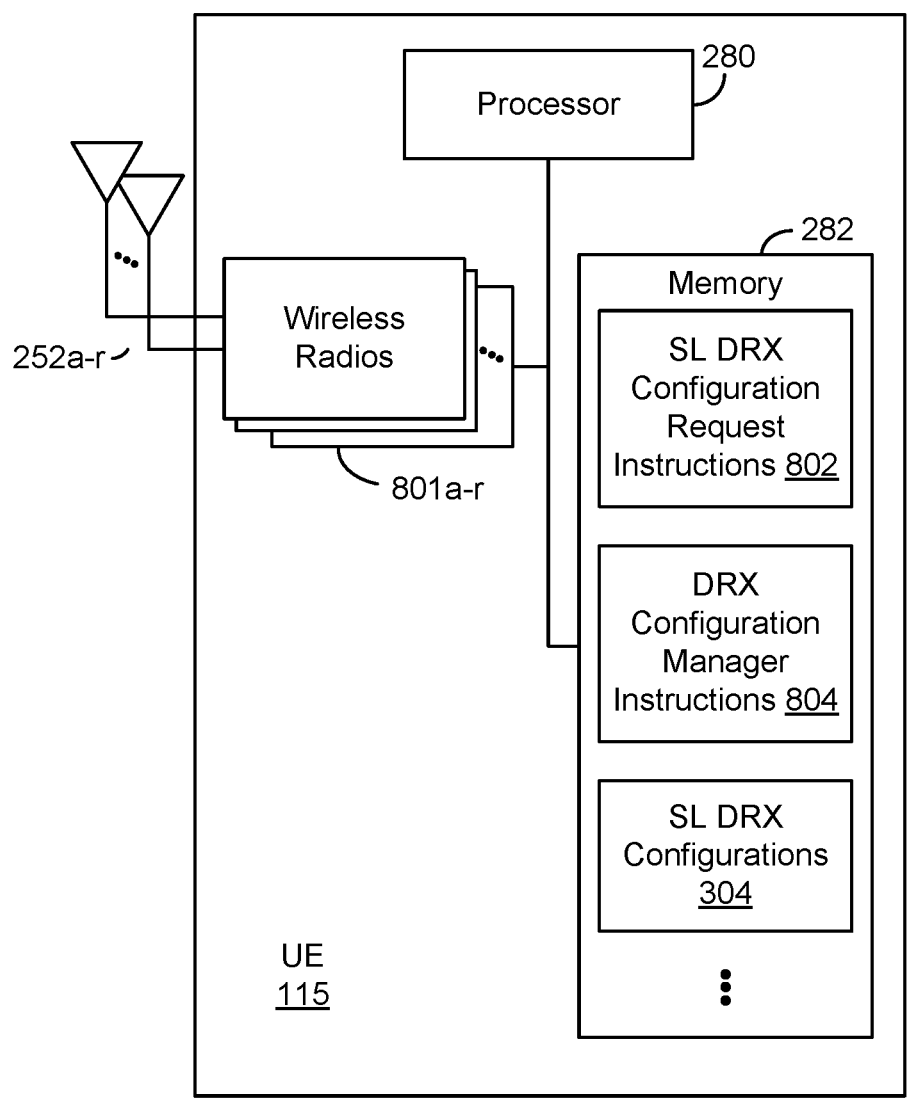
FIG. 8 is a block diagram of an example of a UE according to some aspects of the disclosure.

FIG. 8 is a block diagram illustrating an example of the UE 115 according to some aspects of the disclosure. The UE 115 may include structure, hardware, or components illustrated in FIG. 2. For example, the UE 115 may include the processor 280, which may execute instructions stored in the memory 282. Using the processor 280, the UE 115 may transmit and receive signals via wireless radios 801a-r and antennas 252a-r. The wireless radios 801a-r may include one or more components or devices described herein, such as the modulator/demodulators 254a-r, the MIMO detector 256, the receive processor 258, the transmit processor 264, the TX MIMO processor 266, the transmitter 356x or 356y, the receiver 358x or 358y, one or more other components or devices, or a combination thereof.

In some implementations, the processor 280 may execute instructions stored at the memory 282 to initiate, perform, or control one or more operations described herein. For example, the processor 280 may execute SL DRX configuration request instructions 802 stored at the memory 282 to perform one or more operations described with reference to the UE 115y, such as transmission of the request 150. Alternatively or in addition, the processor 280 may execute DRX configuration manager instructions 804 stored at the memory 282 to operate as a DRX configuration manager in some cases. For example, the processor 280 may execute the DRX configuration manager instructions 804 to perform one or more operations described with reference to the UE 115z, such as selection of the one or more parameters 336 (e.g., based on the SL DRX configurations 304) and transmission of the configuration message 334.

According to some further aspects, in a first aspect, a first user equipment (UE) for wireless communication includes a transmitter configured to transmit, to a second UE, a request associated with a sidelink discontinuous reception (DRX) configuration of the first UE for sidelink communication between the first UE and one or more UEs that are distinct from the first UE. The first UE further includes a receiver configured to receive, from the second UE based on the request, a message indicating one or more parameters associated with the sidelink DRX configuration. The transmitter is further configured to transmit, to the second UE based on the message, a response indicating one of acceptance of or rejection of at least one parameter of the one or more parameters.

In a second aspect in addition to the first aspect, the one or more parameters include one or more of a periodicity associated with a DRX cycle of the sidelink DRX configuration, a duration of a DRX-on portion of the DRX cycle, a duration of a DRX-off portion of the DRX cycle, a timing of the DRX-on portion within the DRX cycle, or a timing of the DRX-off portion within the DRX cycle.

In a third aspect alternatively or in addition to one or more of the first through second aspects, the response indicates acceptance of the one or more parameters, and one or more of the transmitter or the receiver are configured to perform the sidelink communication with the one or more UEs based on the sidelink DRX configuration.

In a fourth aspect alternatively or in addition to one or more of the first through third aspects, the response indicates rejection of the one or more parameters, the receiver is further configured to receive, from the second UE, a second message indicating one or more second parameters associated with the sidelink DRX configuration, and the transmitter is further configured to transmit, to the second UE, a second response to the second message indicating one of acceptance of the one or more second parameters or rejection of at least one parameter of the one or more second parameters.

In a fifth aspect alternatively or in addition to one or more of the first through fourth aspects, the receiver is further configured to receive a third message indicating the second UE as a DRX configuration manager, and the third message corresponds to one or more of a broadcast message, a groupcast message, a master information block (MIB) associated with the second UE, or a sidelink control information (SCI) message.

In a sixth aspect alternatively or in addition to one or more of the first through fifth aspects, the request is for the second UE to perform one of management of the sidelink DRX configuration by determining the one or more parameters on behalf of the first UE or support of the sidelink DRX configuration by configuring the first UE with the one or more parameters.

In a seventh aspect alternatively or in addition to one or more of the first through sixth aspects, the request indicates one or more of identification (ID) information of the one or more UEs, capability information of the one or more UEs, quality of service (QoS) information associated with the first UE, power management information associated with the first UE, or sidelink DRX information associated with the one or more UEs.

In an eighth aspect alternatively or in addition to one or more of the first through seventh aspects, the second UE is configured to determine the one or more parameters based on one or more of a capability of the first UE, quality of service (QoS) information associated with the first UE, power management information associated with the first UE, sidelink DRX information associated with the one or more UEs, or sidelink DRX information associated with at least one other UE within a threshold proximity of the first UE.

In a ninth aspect alternatively or in addition to one or more of the first through eighth aspects, the message corresponds to a radio resource control (RRC) reconfiguration complete sidelink message that is transmitted to the first UE, to the one or more UEs, and to at least one other UE within a threshold proximity of the first UE.

In a tenth aspect alternatively or in addition to one or more of the first through ninth aspects, the apparatus includes a processor configured to select the second UE as a DRX configuration manager of a group of UEs that includes the first UE and the one or more UEs.

In an eleventh aspect alternatively or in addition to one or more of the first through tenth aspects, the processor is further configured to generate data representing a connection graph that is based on sidelink connections associated with the second UE and the one or more UEs and to select the second UE as the DRX configuration manager based on the connection graph.

In a twelfth aspect alternatively or in addition to one or more of the first through eleventh aspects, the processor is further configured to initiate a groupcast connection with the second UE and the one or more UEs and to select the second UE as the DRX configuration manager based on the groupcast connection.

In a thirteenth aspect alternatively or in addition to one or more of the first through twelfth aspects, the processor is further configured to select the second UE as the DRX configuration manager based on one or more of an announcement message from the second UE, a sidelink UE information message from the second UE, a location of the second UE, a number of sidelink connections associated with the second UE, or a capability of the second UE.

In a fourteenth aspect alternatively or in addition to one or more of the first through thirteenth aspects, the receiver is further configured to receive a first announcement message from a particular UE indicating the particular UE as the DRX configuration manager, and the transmitter is further configured to transmit, based on the first announcement message, a first broadcast message indicating one of acceptance of or rejection of the particular UE as the DRX configuration manager.

In a fifteenth aspect alternatively or in addition to one or more of the first through fourteenth aspects, the receiver is further configured to receive a second announcement message nominating the second UE as the DRX configuration manager instead of the particular UE, and the transmitter is further configured to transmit, based on the second announcement message, a second broadcast message indicating one of acceptance of or rejection of the second UE as the DRX configuration manager.

In a sixteenth aspect alternatively or in addition to one or more of the first through fifteenth aspects, the processor is further configured to initiate reselection of the DRX configuration manager based on one or more of a sidelink communication topology change, a sidelink connection change, or a retirement message received from the DRX configuration manager.

In a seventeenth aspect alternatively or in addition to one or more of the first through sixteenth aspects, a method of wireless communication performed by a first user equipment (UE) includes transmitting, to a second UE, a request associated with a sidelink discontinuous reception (DRX) configuration of the first UE for sidelink communication between the first UE and one or more UEs that are distinct from the first UE. The method further includes receiving, from the second UE based on the request, a message indicating one or more parameters associated with the sidelink DRX configuration. The method further includes transmitting, to the second UE based on the message, a response indicating one of acceptance of or rejection of at least one parameter of the one or more parameters.

In an eighteenth aspect alternatively or in addition to one or more of the first through seventeenth aspects, if the response indicates acceptance of the one or more parameters, the method further includes performing the sidelink communication with the one or more UEs based on the sidelink DRX configuration, and if the response indicates rejection of the one or more parameters, the method further includes receiving, from the second UE, a second message indicating one or more second parameters associated with the sidelink DRX configuration and transmitting, to the second UE, a second response to the second message indicating one of acceptance of the one or more parameters or rejection of at least one parameter of the one or more second parameters.

In a nineteenth aspect alternatively or in addition to one or more of the first through eighteenth aspects, the method includes receiving a third message indicating the second UE as a DRX configuration manager, and the third message corresponds to one or more of a broadcast message, a groupcast message, a master information block (MIB) associated with the second UE, or a sidelink control information (SCI) message.

In a twentieth aspect alternatively or in addition to one or more of the first through nineteenth aspects, the request is for the second UE to perform one of management of the sidelink DRX configuration by determining the one or more parameters on behalf of the first UE or support of the sidelink DRX configuration by configuring the first UE with the one or more parameters, and the request indicates one or more of identification (ID) information of the one or more UEs, capability information of the one or more UEs, quality of service (QoS) information associated with the first UE, power management information associated with the first UE, or sidelink DRX information associated with the one or more UEs.

In a twenty-first aspect alternatively or in addition to one or more of the first through twentieth aspects, the second UE determines the one or more parameters based on one or more of a capability of the first UE, quality of service (QoS) information associated with the first UE, power management information associated with the first UE, sidelink DRX information associated with the one or more UEs, or sidelink DRX information associated with at least one other UE within a threshold proximity of the first UE.

In a twenty-second aspect alternatively or in addition to one or more of the first through twenty-first aspects, the message corresponds to a radio resource control (RRC) reconfiguration complete sidelink message that is transmitted to the first UE, to the one or more UEs, and to at least one other UE within a threshold proximity of the first UE.

In a twenty-third aspect alternatively or in addition to one or more of the first through twenty-second aspects, the method includes selecting the second UE as a DRX configuration manager of a group of UEs that includes the first UE and the one or more UEs.

In a twenty-fourth aspect alternatively or in addition to one or more of the first through twenty-third aspects, the method includes generating data representing a connection graph that is based on sidelink connections associated with the second UE and the one or more UEs, and the second UE is selected as the DRX configuration manager based on the connection graph.

In a twenty-fifth aspect alternatively or in addition to one or more of the first through twenty-fourth aspects, the method includes forming a groupcast connection with the second UE and the one or more UEs, and the second UE is selected as the DRX configuration manager based on the groupcast connection.

In a twenty-sixth aspect alternatively or in addition to one or more of the first through twenty-fifth aspects, the second UE is selected as the DRX configuration manager based on one or more of an announcement message from the second UE, a sidelink UE information message from the second UE, a location of the second UE, a number of sidelink connections associated with the second UE, or a capability of the second UE.

In a twenty-seventh aspect alternatively or in addition to one or more of the first through twenty-sixth aspects, the method includes receiving a first announcement message from a particular UE indicating the particular UE as the DRX configuration manager. Based on the first announcement message, a first broadcast message is transmitted indicating one of acceptance of or rejection of the particular UE as the DRX configuration manager. A second announcement message is received nominating the second UE as the DRX configuration manager instead of the particular UE. Based on the second announcement message, a second broadcast message is transmitted indicating one of acceptance of or rejection of the second UE as the DRX configuration manager.

In a twenty-eighth aspect alternatively or in addition to one or more of the first through twenty-seventh aspects, the method includes performing reselection of the DRX configuration manager based on one or more of a sidelink communication topology change, a sidelink connection change, or a retirement message received from the DRX configuration manager.

In a twenty-ninth aspect alternatively or in addition to one or more of the first through twenty-eighth aspects, an apparatus for wireless communication includes a receiver configured to receive, from a first UE, a request associated with a sidelink discontinuous reception (DRX) configuration of the first UE for sidelink communication between the first UE and one or more UEs that are distinct from the first UE. The apparatus further includes a transmitter configured to transmit, to the first UE based on the request, a message indicating one or more parameters associated with the sidelink DRX configuration. The receiver is further configured to receive, from the first UE based on the message, a response indicating one of acceptance of or rejection of at least one parameter of the one or more parameters.

In a thirtieth aspect alternatively or in addition to one or more of the first through twenty-ninth aspects, a method of wireless communication includes receiving, from a first UE, a request associated with a sidelink discontinuous reception (DRX) configuration of the first UE for sidelink communication between the first UE and one or more UEs that are distinct from the first UE. The method further includes transmitting, to the first UE based on the request, a message indicating one or more parameters associated with the sidelink DRX configuration. The method further includes receiving, from the first UE based on the message, a response indicating one of acceptance of or rejection of at least one parameter of the one or more parameters.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein may include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

The various illustrative logics, logical blocks, modules, circuits and algorithm processes described in connection with the implementations disclosed herein may be implemented as electronic hardware, computer software, or combinations of both. Whether such functionality is implemented in hardware or software may depend upon the particular application and design of the overall system.

A hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A first user equipment (UE) for wireless communication, the first UE comprising:
    a processing system including one or more processors and one or more memories coupled to the one or more processors, the processing system configured to:
        communicate an indication associated with selection of a second UE as a discontinuous reception (DRX) configuration manager of a group of UEs that includes the first UE and one or more UEs;
        transmit, to the second UE, a request for a sidelink DRX configuration of the first UE for sidelink communication between the first UE and the one or more UEs, wherein the one or more UEs are distinct from the first UE, and wherein the one or more UEs include at least a third UE that is distinct from the second UE;
        receive, from the second UE based on the request, a message indicating one or more parameters associated with the sidelink DRX configuration; and
        transmit, to the second UE based on the message, a response indicating one of acceptance of or rejection of at least one parameter of the one or more parameters.

2. The first UE of claim 1, wherein the one or more parameters include one or more of a periodicity associated with a DRX cycle of the sidelink DRX configuration, a duration of a DRX-on portion of the DRX cycle, a duration of a DRX-off portion of the DRX cycle, a timing of the DRX-on portion within the DRX cycle, or a timing of the DRX-off portion within the DRX cycle.

3. The first UE of claim 1, wherein the response indicates acceptance of the one or more parameters, and wherein the processing system is further configured to perform the sidelink communication with the one or more UEs based on the sidelink DRX configuration.

4. The first UE of claim 1, wherein the response indicates rejection of the one or more parameters, wherein the processing system is further configured to receive, from the second UE, a second message indicating one or more second parameters associated with the sidelink DRX configuration, and wherein the processing system is further configured to transmit, to the second UE, a second response to the second message indicating one of acceptance of the one or more second parameters or rejection of at least one parameter of the one or more second parameters.

5. The first UE of claim 1, wherein the processing system is further configured to receive a third message indicating the second UE as the DRX configuration manager, wherein the third message corresponds to one or more of a broadcast message, a groupcast message, a master information block (MIB) associated with the second UE, or a sidelink control information (SCI) message.

6. The first UE of claim 1, wherein the request is for the second UE to perform one of management of the sidelink DRX configuration by determining the one or more parameters on behalf of the first UE or support of the sidelink DRX configuration by configuring the first UE with the one or more parameters.

7. The first UE of claim 1, wherein the request indicates one or more of identification (ID) information of the one or more UEs, capability information of the one or more UEs, quality of service (QOS) information associated with the first UE, power management information associated with the first UE, or sidelink DRX information associated with the one or more UEs.

8. The first UE of claim 1, wherein the second UE is configured to determine the one or more parameters based on one or more of a capability of the first UE, quality of service (QOS) information associated with the first UE, power management information associated with the first UE, sidelink DRX information associated with the one or more UEs, or sidelink DRX information associated with at least one other UE within a threshold proximity of the first UE.

9. The first UE of claim 1, wherein the message corresponds to a radio resource control (RRC) reconfiguration complete sidelink message that is transmitted to the first UE, to the one or more UEs, and to at least one other UE within a threshold proximity of the first UE.

10. The first UE of claim 1, further comprising a processor configured to select the second UE as the DRX configuration manager of the group of UEs.

11. The first UE of claim 10, wherein the processor is further configured to generate data representing a connection graph that is based on sidelink connections associated with the second UE and the one or more UEs and to select the second UE as the DRX configuration manager based on the connection graph.

12. The first UE of claim 10, wherein the processor is further configured to initiate a groupcast connection with the second UE and the one or more UEs and to select the second UE as the DRX configuration manager based on the groupcast connection.

13. The first UE of claim 10, wherein the processor is further configured to select the second UE as the DRX configuration manager based on one or more of an announcement message from the second UE, a sidelink UE information message from the second UE, a location of the second UE, a number of sidelink connections associated with the second UE, or a capability of the second UE.

14. The first UE of claim 10, wherein the processing system is further configured to receive a first announcement message from a particular UE indicating the particular UE as the DRX configuration manager, and wherein the processing system is further configured to transmit, based on the first announcement message, a first broadcast message indicating one of acceptance of or rejection of the particular UE as the DRX configuration manager.

15. The first UE of claim 14, wherein the processing system is further configured to receive a second announcement message nominating the second UE as the DRX configuration manager instead of the particular UE, and wherein the processing system is further configured to transmit, based on the second announcement message, a second broadcast message indicating one of acceptance of or rejection of the second UE as the DRX configuration manager.

16. The first UE of claim 10, wherein the processor is further configured to initiate reselection of the DRX configuration manager based on one or more of a sidelink communication topology change, a sidelink connection change, or a retirement message received from the DRX configuration manager.

17. The first UE of claim 1, wherein the processing system is further configured to transmit the indication via a sidelink channel or to receive the indication via the sidelink channel, and wherein the indication includes one or more of one or more of a broadcast message, a groupcast message, a master information block (MIB) associated with the second UE, a sidelink control information (SCI) message, or an announcement message indicating the second UE volunteers or is nominated as the DRX configuration manager.

18. The first UE of claim 1, wherein, as the DRX configuration manager of the group of UEs, the second UE is associated with configuration of a plurality of sidelink DRX configurations for the group of UEs, the plurality of sidelink DRX configurations including the sidelink DRX configuration.

19. A method of wireless communication performed by a first user equipment (UE), the method comprising:
   communicating, by the first UE, an indication associated with selection of a second UE as a discontinuous reception (DRX) configuration manager of a group of UEs that includes the first UE and one or more UEs;
   transmitting, to the second UE, a request for a sidelink DRX configuration of the first UE for sidelink communication between the first UE and the one or more UEs, wherein the one or more UEs are distinct from the first UE, and wherein the one or more UEs include at least a third UE that is distinct from the second UE;
   receiving, from the second UE based on the request, a message indicating one or more parameters associated with the sidelink DRX configuration; and
   transmitting, to the second UE based on the message, a response indicating one of acceptance of or rejection of at least one parameter of the one or more parameters.

20. The method of claim 19, wherein, in accordance with the response indicating acceptance of the one or more parameters, the method further includes performing the sidelink communication with the one or more UEs based on the sidelink DRX configuration, and wherein, in accordance with the response indicating rejection of the one or more parameters, the method further includes:
   receiving, from the second UE, a second message indicating one or more second parameters associated with the sidelink DRX configuration; and
   transmitting, to the second UE, a second response to the second message indicating one of acceptance of the one or more second parameters or rejection of at least one parameter of the one or more second parameters.

21. The method of claim 19, wherein communicating the indication includes receiving a third message indicating the second UE as the DRX configuration manager, wherein the third message corresponds to one or more of a broadcast message, a groupcast message, a master information block (MIB) associated with the second UE, or a sidelink control information (SCI) message.

22. The method of claim 19, wherein the request is for the second UE to perform one of management of the sidelink DRX configuration by determining the one or more parameters on behalf of the first UE or support of the sidelink DRX configuration by configuring the first UE with the one or more parameters, and wherein the request indicates one or more of identification (ID) information of the one or more UEs, capability information of the one or more UEs, quality of service (QOS) information associated with the first UE, power management information associated with the first UE, or sidelink DRX information associated with the one or more UEs.

23. The method of claim 19, further comprising selecting the second UE as the DRX configuration manager of the group of UEs.

24. The method of claim 23, further comprising generating data representing a connection graph that is based on sidelink connections associated with the second UE and the one or more UEs, wherein the second UE is selected as the DRX configuration manager based on the connection graph.

25. The method of claim 23, further comprising forming a groupcast connection with the second UE and the one or more UEs, wherein the second UE is selected as the DRX configuration manager based on the groupcast connection.

26. The method of claim 23, wherein the second UE is selected as the DRX configuration manager based on one or more of an announcement message from the second UE, a sidelink UE information message from the second UE, a location of the second UE, a number of sidelink connections associated with the second UE, or a capability of the second UE.

27. The method of claim 23, further comprising:
receiving a first announcement message from a particular UE indicating the particular UE as the DRX configuration manager;
based on the first announcement message, transmitting a first broadcast message indicating one of acceptance of or rejection of the particular UE as the DRX configuration manager;
receiving a second announcement message nominating the second UE as the DRX configuration manager instead of the particular UE; and
based on the second announcement message, transmitting a second broadcast message indicating one of acceptance of or rejection of the second UE as the DRX configuration manager.

28. The method of claim 23, further comprising performing reselection of the DRX configuration manager based on one or more of a sidelink communication topology change, a sidelink connection change, or a retirement message received from the DRX configuration manager.

29. An apparatus for wireless communication, the apparatus comprising:
a processing system including one or more processors and one or more memories coupled to the one or more processors, the processing system configured to:
communicate, by a second user equipment (UE), an indication associated with selection of the second UE as a discontinuous reception (DRX) configuration manager of a group of UEs that includes a first UE and one or more UEs;
receive, from the first UE and by the second UE, a request for a sidelink DRX configuration of the first UE for sidelink communication between the first UE and the one or more UEs, wherein the one or more UEs are distinct from the first UE, and wherein the one or more UEs include at least a third UE that is distinct from the second UE;
transmit, to the first UE based on the request, a message indicating one or more parameters associated with the sidelink DRX configuration; and
receive, from the first UE based on the message, a response indicating one of acceptance of or rejection of at least one parameter of the one or more parameters.

30. A method of wireless communication, the method comprising:
communicating, by a second user equipment (UE), an indication associated with selection of the second UE as a discontinuous reception (DRX) configuration manager of a group of UEs that includes a first UE and one or more UEs;
receiving, from the first UE and by the second UE, a request for a sidelink DRX configuration of the first UE for sidelink communication between the first UE and the one or more UEs, wherein the one or more UEs are distinct from the first UE, and wherein the one or more UEs include at least a third UE that is distinct from the second UE;
transmitting, to the first UE based on the request, a message indicating one or more parameters associated with the sidelink DRX configuration; and
receiving, from the first UE based on the message, a response indicating one of acceptance of or rejection of at least one parameter of the one or more parameters.

* * * * *